May 2, 1967 K. J. NEUMANN 3,316,593
MOLDING APPARATUS FOR HARDENABLE SYNTHETIC MATERIAL
Filed June 15, 1964 6 Sheets-Sheet 1
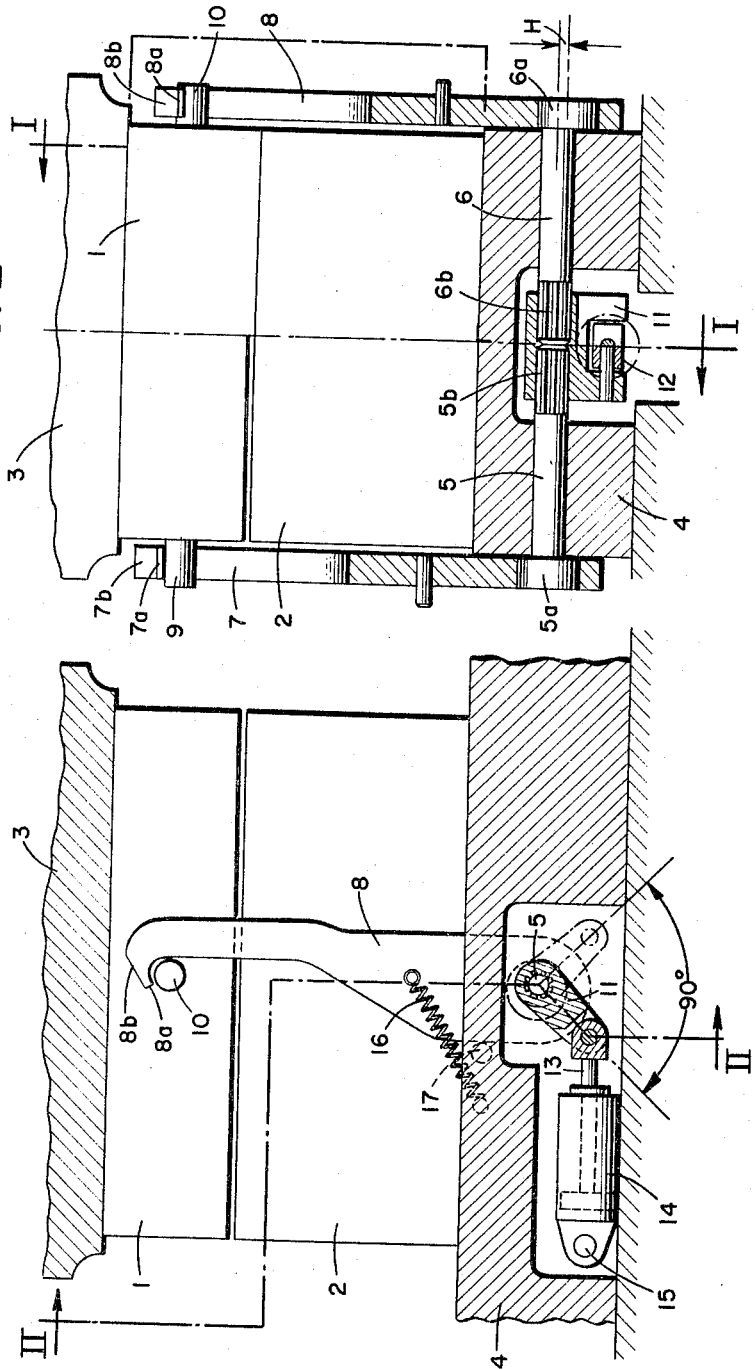
INVENTOR
KARL J. NEUMANN

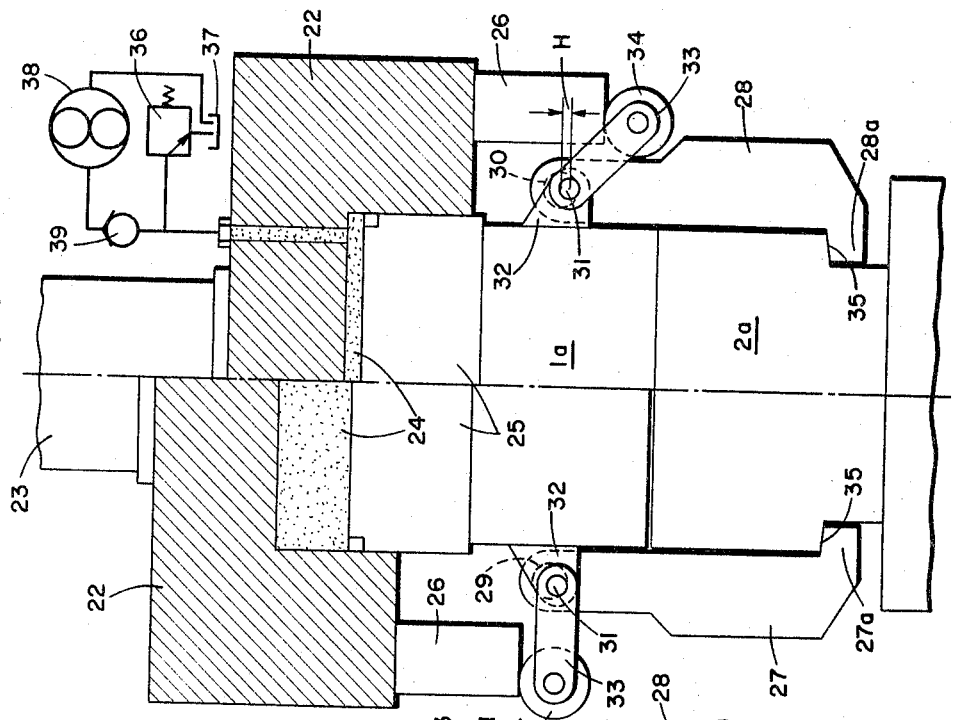
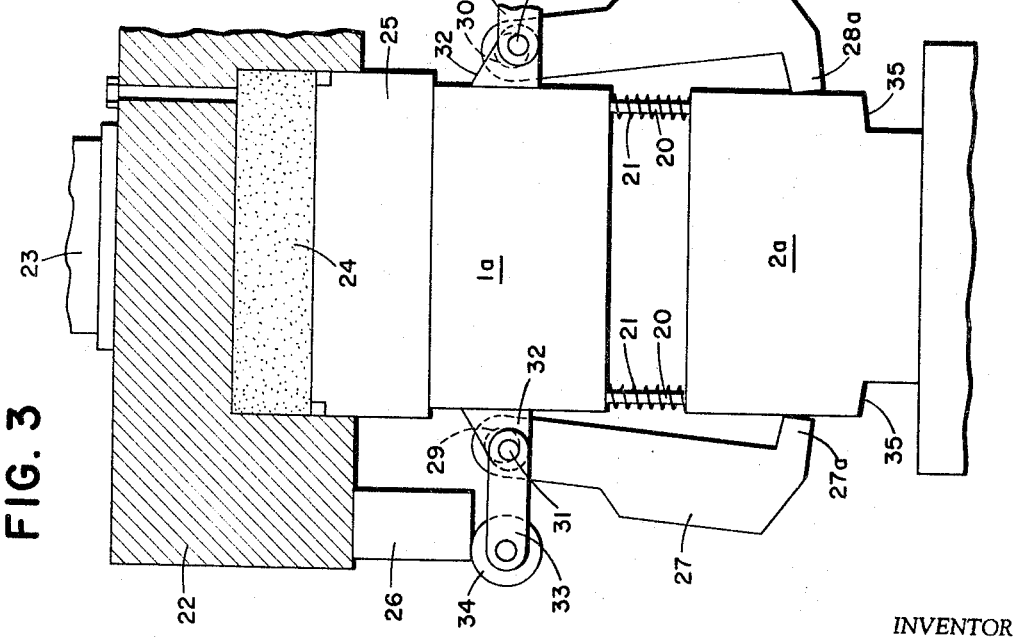

May 2, 1967 K. J. NEUMANN 3,316,593
MOLDING APPARATUS FOR HARDENABLE SYNTHETIC MATERIAL
Filed June 15, 1964 6 Sheets-Sheet 3
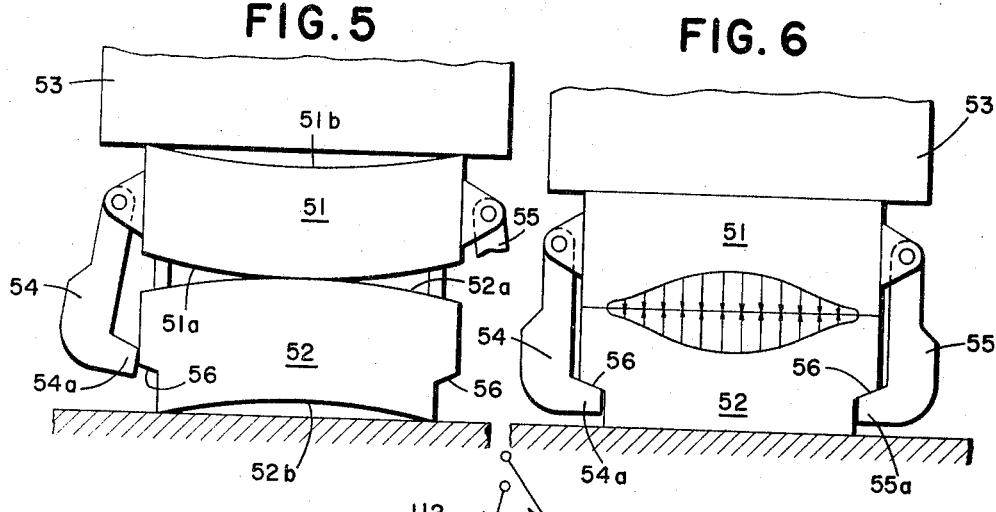
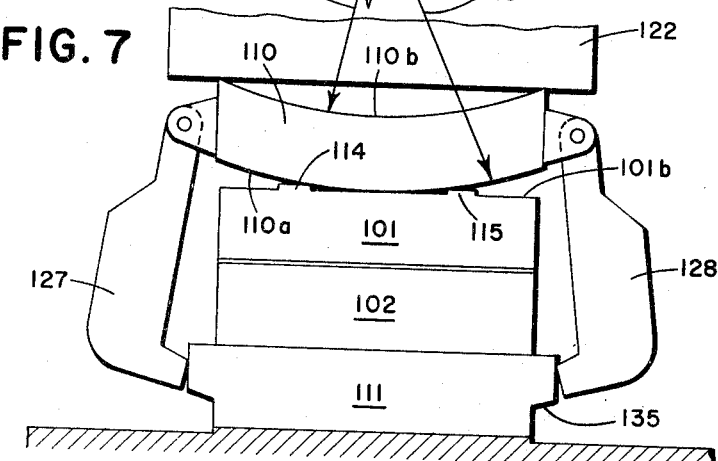
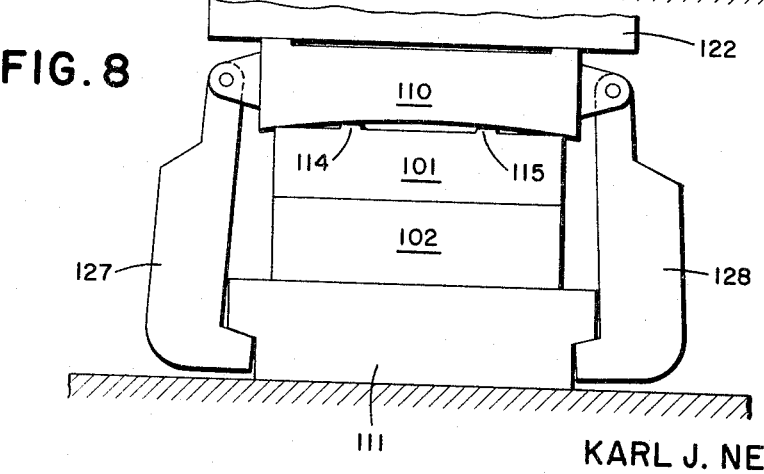
INVENTOR
KARL J. NEUMANN

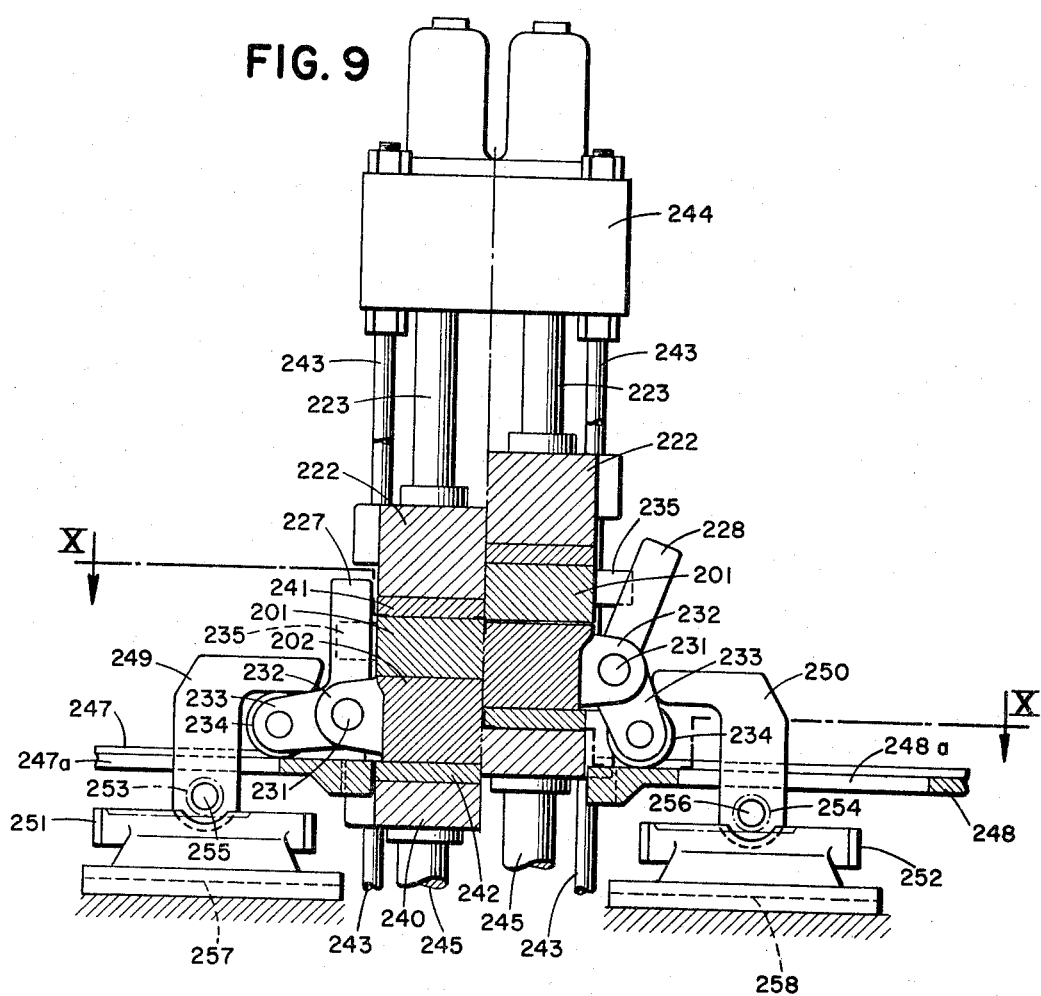
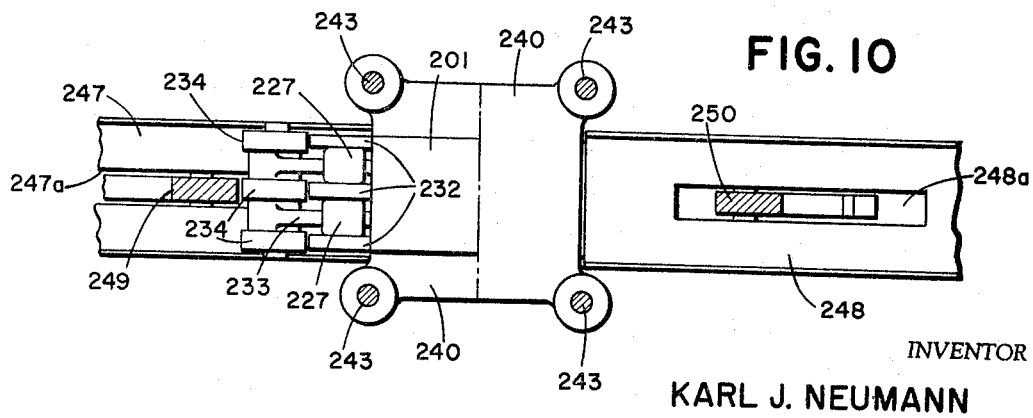

May 2, 1967  K. J. NEUMANN  3,316,593
MOLDING APPARATUS FOR HARDENABLE SYNTHETIC MATERIAL
Filed June 15, 1964  6 Sheets-Sheet 5
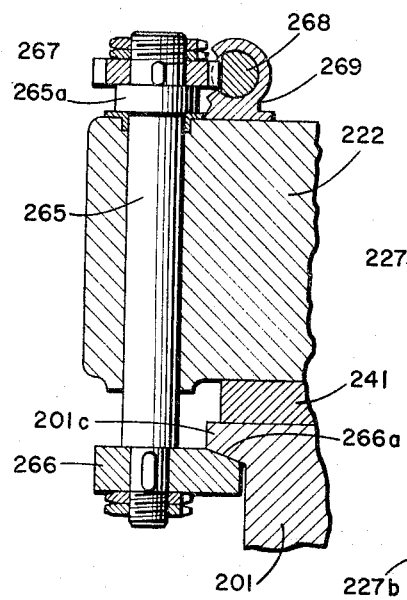
FIG. 11
FIG. 12
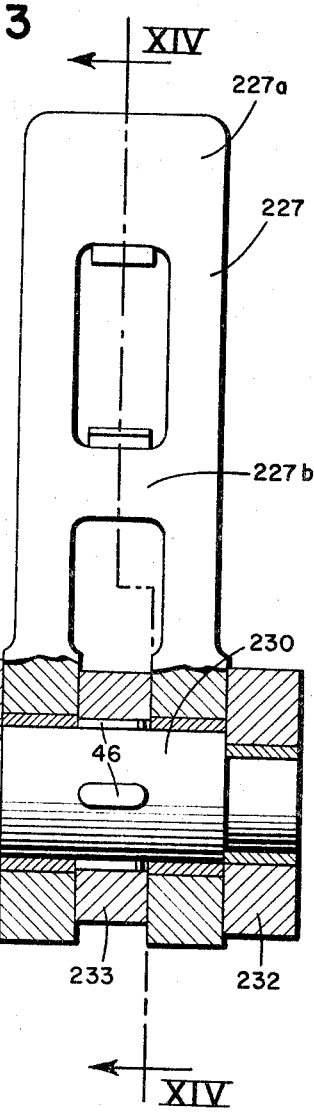
FIG. 13
INVENTOR
KARL J. NEUMANN

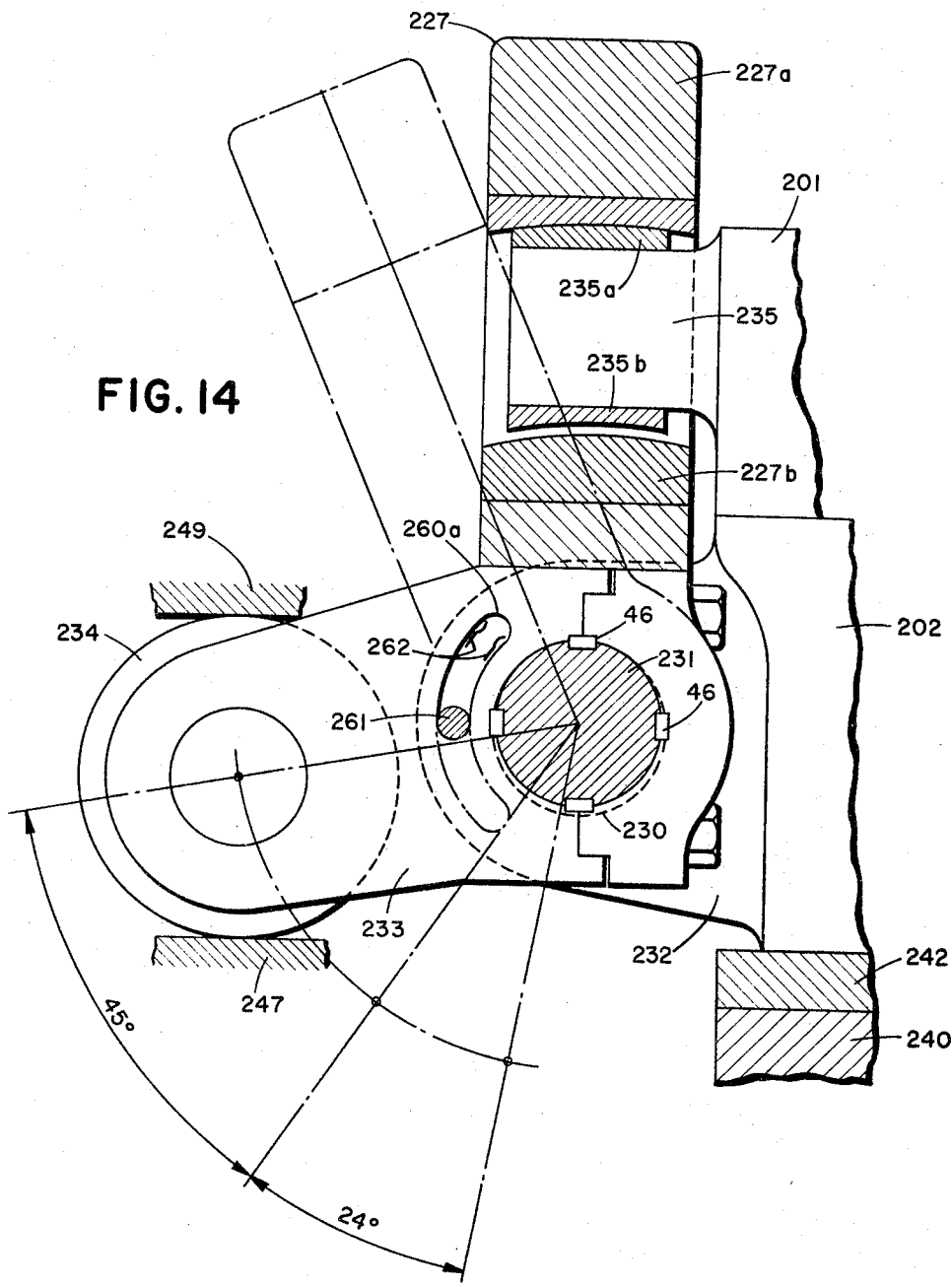

United States Patent Office 3,316,593
Patented May 2, 1967

3,316,593
MOLDING APPARATUS FOR HARDENABLE
SYNTHETIC MATERIALS
Karl Josef Neumann, Wallerfelfstrasse 2,
St. Ingbert, Saar, Germany
Filed June 15, 1964, Ser. No. 374,762
10 Claims. (Cl. 18—16)

The invention relates to an installation comprising a press and molding form for manufacturing molded parts from plastic materials, especially hardenable synthetic materials subjected to a hot pressing operation in which the form is maintained under pressure during a baking or hardening period after the form has been closed. The invention is particularly applicable to hydraulic presses for closing and opening the molding forms.

The production output of molded plastic parts is basically limited because of the required baking or hardening period during which the press is idle. In the manufacture of parts by injection molding the problem of filling several forms with a single injection molding machine for the purpose of obtaining an overlapping of the baking period is easily solved for smaller parts. But in injection molding the problem is simpler than in hot pressing operations because the forms may be closed tightly already before the plastic material is injected. In these processes rotary tables or reciprocating carriages are employed on which a mechanism for closing and opening the form is provided for each form.

The production of plastic parts by injection molding is not economical for large-size parts. Furthermore the injection molding process is not applicable for the production of parts made from a plastic which is reinforced by glass fibers, mats or the like. For this reason the manufacture of the large parts, for example parts for automobile bodies, must be produced by hot pressing in a press, and this process has, in the past, not allowed a high production rate.

As far as the features of the molding forms disclosed herein are concerned, they could also be used in presses for injection molds. The invention provides means for making the production output of a single press independent of the baking period. According to the invention the form is removed from the press during the baking period while the form is maintained under pressure. This is obtained basically in that a clamping device for the closed form has tensioning rods for clamping the two form halves together, and is removed from the press together with the form.

The tension rods of the clamping device may be connected directly to the form halves or indirectly to a head or base plate between which the form halves are received. In the latter case the forms do not need to carry parts of the clamping device, so that already existing forms may be employed within the process of removing the closed forms from the press during the baking period, in order to free the press to receive and close additional forms.

The invention provides three methods of placing the tension rods of the clamping device under stress in such a way that the form does not spring back when the press is opened, as this would be detrimental to the desired tolerance of the press part.

It is an object of the invention to provide a press which has a movable support in the form of a slide carriage or rotary table, wherein the tension rods are carried by a movable support for the form and may be placed under tension by a mechanism which is independent of the power of the press.

It is also an object of the invention to place the tension rods under stress through the power of the press in an indirect way in that at least one of the parts to which the tension rods of the clamping device are connected, is susceptible of bending under the pressure force due to a different structural form of its opposite pressure surfaces, so that the bending stress of the locked form parts, after removal from the press, is transferred into the tension rods.

It is another object of the invention to provide operating means for the clamping device through which the pressure force takes effect directly at the tension rods in a transmission ratio which is magnified several times, so that the press need be designed only for the amount of the force required to produce the molded parts. As the tension rods are tensioned during the pressing operation under the active press force, they do not spring back when the press is opened to allow the removal of the closed form.

The pre-bending of the forms or head and base plates may also be useful when the tension rods of the clamping device are tensioned by means of an auxiliary drive or over a transmission ratio of the press force. When large-size form parts, for example automobile parts, boat bodies, or the like are produced there exists the danger that the form halves spring back and bend in the middle when the press is opened because the form halves are tensioned by the clamping device only at the edges, perhaps only at the small sides of the form. But in the case where the forms are pre-bent and are forced straight subsequently due to the tension in the tension rods, the bending stress in the form halves at the center of the form has the effect of a residual pressing force.

Other objects and advantages of the invention will become readily apparent upon reading the following specification in conjunction with the accompanying drawings which illustrate various embodiments of the invention and in which FIGURES 1 and 2 show in elevation a side view and an end view of a clamping device operable independently of the press force, an almost closed form being located on a slide carriage or rotary table shown in section, along line I—I of FIGURE 2 or along line II—II of FIGURE 1, FIGURES 3 and 4 show an elevation view of a clamping device carried by the upper form part and operated by the descending press table over power transmission means, the press table being shown in section, FIGURES 5 and 6 show an elevation view of a two-part form having tension rods connected directly to one of the form halves and providing indirect transmission of the press force into the tension rods, FIGURES 7 and 8 show an elevation view of a form and a clamping device providing a clamping connection between two plates between which the molding form is sandwiched, also for indirect transmission of the press force into the tension rods, FIGURE 9 shows an elevation view of a hydraulic press, partly in section through the upper and lower table, the left half of the FIGURE showing the position of the press tables and of the clamping device in the locked position, and the right half showing these positions in the unlocked condition of the clamping device, FIGURE 10 shows a plan view of a section along line IX—IX of FIGURE 9, the left half showing the left half of the lower press table with a form located thereon, and the right half without a form, FIGURE 11 shows a vertical section of an element of a mechanical quick tension device for locking the form against the upper press table, FIGURE 12 shows an end view of the quick tensioning device according to FIGURE 11 from below, FIGURE 13 shows a tension rod arrangement on one side of the clamping device including an eccentric shaft and, FIGURE 14 shows an enlarged side view of the co-operation of the clamping levers and tension rods for the automatic locking and releasing of the tension rods, in section along lines XIV—XIV of FIGURE 13, In FIGURE 1 the molding form consisting of an upper part 1 and a lower part 2 is placed between the movable press table 3 and a retractable support 4 of a slide carriage or a rotary table. At the support 4 two eccentric shafts 5 and 6 are mounted from opposite sides and carry eccentric members 5a and 6a respectively. The eccentric members 5a and 6a carry upright tension rods 7 and 8 which are pivotable around the eccentric members. The tension rods 7 and 8 have hooked upper extremities 7a and 8a which extend, in the almost closed position of the form, over locking members or lateral pins 9 and 10 on the upper part 1 of the form.

The eccentric shafts 5 and 6 carry at their adjacent ends grooved or splined portions 5b and 6b which are received in a common forked lever 11. The piston rod 13 of an auxiliary drive means or hydraulic cylinder 14 which is mounted pivotably in the retractable support 4 at 15 is connected to lever 11 over a bearing block 12. Through this power drive the eccentric shafts 5 and 6 and their eccentric members 5a and 6a respectively may be rotated.

The operation of the clamping device according to FIGURES 1 and 2 is the following: When the opened form containing the plastic mass has been moved into the press by means of support 4 and after the press table 3 has moved the upper part 1 of the form downwardly, the pins 9 and 10 abut against the hooked slanting surfaces 7b and 8b of the tension rods 7 and 8 and force them to deflect side-ways against the biasing force of the tension springs 16 from the upright position illustrated which is predetermined by abutment pin 17 on support 4. When the form is closed the tension rods 7 and 8 swing into the position shown in FIGURE 1 so that the hooked portions 7a and 8a move over the pins 9 and 10 in the locked position.

In the starting position the eccentric members 5a and 6a according to FIGURES 1 and 2 are located 90° before their lower dead center point. In this position the hooked portions 7a and 8a of the tension rods 7 and 8 are not in engagement with the pins 9 and 10. When the piston rod 13 of the hydraulic cylinder 14 is advanced, lever 11 makes a swinging motion of 90° whereby the eccentric members, as shown in FIGURE 2, reach the lower dead center position so that the tension rods 7 and 8 are moved downwardly by the amount of a stroke H. The upper and lower parts of the form are then securely locked or tensioned together. After the press head 3 has moved back, the closed form is removed from the press whereby simultaneously a new form is inserted from the other side. As the baking time for the removed form is usually longer than the inserting and closing time for a new form, and because the receiving point on the support 4 is blocked for the removed form, the clamping device according to FIGURES 1 and 2 is especially suitable for rotary presses.

The stroke H of the eccentric members 5a and 6a, the length of the lever 11 as well as the hydraulic tensioning force may be so designed that through the clamping device a larger force may be exerted than the pressing force of the press. The pressing force of the press may therefore be reduced to a small pre-pressure which is just sufficient to force the upper part 1 of the molding form downwardly far enough that the hooked portions 7a and 8a are able to move over the pins 9 and 10.

The embodiment according to FIGURES 3 and 4 is provided to show a clamping arrangement which is independent of the retractable support means. Accordingly the form which is removed from the press by hand or by means of a carriage may be set aside during the baking period so that the carriage is no longer blocked.

The form consists again of an upper part 1a and a lower part 2a which are moved relative to each other over four or over three columns 20. Springs 21 maintain the upper part in the up position when the form is emptied or is filled with the plastic material outside the press. The movable press head 22 is moved by means of one or more pressure pistons 23 and is provided with a pressure chamber 24 and with a pressure piston 25 which is mounted over the upper part 1a of the form, which will be explained in greater detail hereinafter.

The clamping device illustrated in FIGURES 3 and 4 and carried by the upper part 1a of the molding form is operated by the descending press head 22, specifically by projecting press rams 26. The actual clamping device consists of either one or more pairs of tension rods 27 and 28, depending on the length of the form, which are pivotably mounted on the eccentric members 29 and 30. The eccentric shafts 31 are in turn mounted in brackets 32 which are fixed to the upper part 1a of the form. Clamping levers 33 are attached for rotation with the eccentric shafts 31 and carry pressure rolls 34 at their outer ends. These pressure rolls 34 cooperate with the pressure rams 26 of the press head 22 in that they are swung 45° when the press head is moving down, as shown in the right half of FIGURE 4.

The tension rods 27 and 28 carry at their lower ends hook-like extensions 27a and 28a which move under the clamping surfaces 35 of the lower part 2a of the molding form when it is almost closed, as shown in the left half of FIGURE 4.

The clamping levers 33 are maintained in an approximately horizontal position by springs (not shown) until the pressure rams 26 contact the roller 34. In this starting position the eccentric members 29 and 30 are positioned about 45° in front of the upper dead center point.

The operation is as follows: After the form consisting of upper and lower parts 1a and 2a has been moved into the press while still open, the pressure piston 23 is subjected to hydraulic pressure. The press head 22 containing the compressed fluid cushion in chamber 24 and the pressure piston 25 are moved downwardly until the pressure piston makes contact with the upper part 1a of the form and moves it downwardly. During the stroke without load before the actual pressure is exerted, the upper part 1a with the clamping device 27 through 34, the pressure piston 25, press head 22 and the press rams 26 exert a uniform movement so that the clamping levers 33 and the eccentric members 29 and 30 are not actuated. The tension rods 27 and 28 slide with their hooked extensions 27a and 28a along the side surfaces of the lower part 2a until they pivot inwardly into their stable hanging position, and the extensions move under the clamping surfaces 35 as shown in FIGURE 4. The pressing operation has begun earlier whereby the pressure in chamber 24 increases. The pressure medium is held in the pressure chamber only up to a predetermined pressure set at the pressure relief valve. When the predetermined pressure is exceeded, the pressure medium escapes through valve 36 into the storage container 37 so that the press head 22 with its rams 26 is able to carry out an overstroke at constant hydraulic pressure. By this overstroke the clamping levers 33 are pressed downwardly by the rams 26 and carry out the pivoting movement of 45° as the eccentric members 29 and 30 execute the clamping stroke H and move into the upper dead center point position as illustrated in the right half of FIGURE 4. The tension rods 27 and 28 are lifted and pull the upper part 1a tightly against the lower part 2a.

The force which the rams 26 execute on the clamping levers 33 is determined by the pressure relief valve 36. This force is multiplied by the transmission residing in the length of the clamping levers 33 and in the eccentricity of the eccentric members 29 and 30, so that with a limited pressing force of the press pistons 23 the required high ultimate force is produced by exploiting the rotation momentum. When the press head 22 moves back the pressure piston 25 is also carried back in a conventional manner and pressure fluid is introduced again into the pressure chamber 24 by means of a pump through the pressure relief valve 39. The tension rods 27 and 28 remain in their clamping position after the rams 26 move back because the eccentric members 29 and 30 are in their dead center position, and between the extensions 27a and 28a of the tension rods and the clamping surfaces 35 a self-clamping exists. The molding form which is under maximum pressure may be removed from the press so that it may be left outside the press during the baking period.

With regard to the lever transmission of the clamping device it should be noted that the effective lever arm of the levers 33 becomes smaller with an increase of the clamping stroke of rams 26 in accordance with the sine law. Opposed to this is the fact that the eccentric members 29 and 30 approach already their dead center position in which the power arm comes close to zero.

In providing a clamping device for a closed form which is to be actuated by the force of the press and which is to be removed from the press together with the form, the invention has created a high pressing force with a limited hydraulic force, thus with a relatively weak hydraulic press, by employing lever transmissions with rotary moment or torque.

In the examples according to FIGURES 5 and 6 both form parts 51 and 52 have a different shape at the mutually contacting pressure surfaces in that the surfaces 51a and 52a are convexly curved at the separation joint while the upper surface 51b of the upper part 51 which is engaged by the press table 53 and against which the pressing force is exerted as well as the lower pressure surface 52b of the lower part 52 which is subjected to the reaction force are concave. Therefore the form parts 51 and 52 are pre-curved in the unloaded condition in such a manner that the press force and the reaction force engage in each case along two edges of these parts. When according to FIGURE 6 the forms have been closed by the lowering of the press table 53 the press parts 51 and 52 have been bent into a straight line. In this pressing phase the tension rods 54 and 55 may lock with their hooked extensions 54a and 55a under the clamping surfaces 55 of the lower form part 52.

When the press head 53 moves back, the form parts 51 and 52 are prevented from springing back into their initial shape according to FIGURE 5 due to the locked connection provided by the tension rods. The bending stress remaining in the form parts provides closing forces which are greater in the center of the form than at the edges, as illustrated in FIGURE 6.

In order to employ the alternating pressing process using molding forms locked under pressure which may be removed from the press also for existing molding forms it is proposed to place the form parts between a head plate 110 and a bottom plate 111 to which the locking device is applied. In that case the forms do not have to be equipped with a locking device. The principle of pre-curved parts may be employed also in this case where according to the invention only the head plate 110 is curved, as shown in FIGURE 7. The base plate 111 could be eliminated in order to use the space taken up by this plate so as to reduce the stroke of the press, but in that case the lower form would have to be provided with suitable clamping surfaces, such as the lower form part in FIGURES 5 and 6.

The embodiment of FIGURES 7 and 8 shows that the pressure surface 110b of head plate 110, which receives the pressing force, is bent inwardly to a greater degree in a radius 112 than the other pressure surface 110a whose larger bending radius is designated by 113. At the pressure receiving countersurface 101b of the upper form part 101 cams or ridges 114 and 115 are provided symmetrically to the bending axis. The two cams or ridges 114 and 115 transform the head plate 110 into a doubly supported carrier member at which the pressing force engages outside the bearing surfaces so that the bent head plate 110 is bent by the pressing force beyond the stretched position while engaging only the cams or ridges 114 and 115, as may be seen from FIGURE 8. The cams or ridges project and are spaced such a distance that the head plate 110 bent by the press force does not come into engagement with the upper form part at the edges. This bending of the head plate from the curved shape according to FIGURE 7 beyond the horizontal stretched position into a curve according to FIGURE 8 is only possible when the curvature radius 112 of the pressure surface 110b is smaller than the curvature radius 113 of the other pressure surface 110a, or when the press head 122 has a corresponding concave curvature in order to make sure that the pressing force always engages at the edges of the head plate 110. This provides that also in the case where the tension rods 127 and 128 of the locking device are in the locked position and stretch to a small degree when the press head moves back, and that there is no change in the position or distribution due to the closing force residing in the tension stress of the head plate 110. A load distribution decreasing toward the edges as shown in FIGURE 6 is thus avoided.

It has been proposed heretofore to carry out not only the hardening of the molded part outside the press, but also the opening of the forms, the removal of the molded part as well as the cleaning, filling and heating of the forms. Especially for releasing and opening the forms, additional releasing stations outside the press were necessary which required about 30% of the pressing force of the press itself.

Based on the consideration that the provision of additional releasing stations outside the press makes the installation in view of investment costs economical only in the case where a number of the more expensive forms are available, the invention provides a way to assure economical operation especially in producing large pressed bodies requiring a few minutes of baking time even where only two or three forms are available. This is based on the consideration that it is sufficient to merely locate the baking time outside the press, and to allow the other working operations to take place as heretofore in the press. In order to reach this objective quick tensioning means for opening and unlocking the forms have been provided at the upper and lower tables of the press according to the invention. As the forms come into the press in a locked condition where they are centered relative to each other, magnetic tensioning plates are appropriate as quick tensioning means whose adhesion force may be quickly removed or disconnected. This disconnection is available not only in electromagnets but also in tension plates consisting of permanent magnets. As the tension plates are activated when the form is still locked the form halves remain automatically centered relative to each other after the form has been opened.

For safety reasons it is deemed appropriate to provide additional quick tensioning means for securing and releasing especially the upper magnetic tension plate. While the tension plates in the upper and lower table must have at least sufficient adhesion force to provide the release and opening of the form, the upper tension plate must carry additionally the weight of the upper form half. For this reason it is appropriate to relieve the upper tension plate by an additional mechanical quick tensioning device and to secure the upper form half. Mechanical tensioning means are preferably so designed that they engage the upper form half at opposite sides and are moved by hydraulic or pneumatic adjusting drives which are connected in parallel. The parallel connection of the adjusting drives assures that the tension members act on both sides with the same force on the upper form half and do not displace it relative to the lower half.

As described so far the locking device for the forms may be so designed that it does not take part in the closing of the form itself so that the press must provide the maximum pressing force required for this operation, as in the example of FIGURES 5 through 8. In that case it provides also the required pulling force for releasing and opening the form. But for a clamping device as described above in which the pressing force may be transferred over the operating elements of the locking device into the form in that clamping levers provided with pressure rollers are pivoted by the press, the clamping levers tensioning over eccentric members the tension rods which connect and lock the form halves, the invention shows the way of using the turning moment transmitted by the clamping levers and the eccentric members, which reduces considerably the maximum required press force, also for reducing the releasing force, so that also the requirements of the adhesion force of the magnetic tension plates are reduced. For this arrangement the upper as well as the lower press table are movable and the clamping levers are actuated by contacting fixed abutments while the press tables move at the same speed.

With reference to FIGURE 9 the molding form consisting of the upper half 201 and the lower half 202 is located between the upper movable press table 222 and the lower movable press table 240. Magnetic tension plates 241 and 242 are attached to the press tables. Four columns 243 connect the rigid upper cross beam 244 and the lower cross beam (not shown) and the press tables 222 and 240 are guided on these columns. Two press pistons 223 act against the upper press table 222 while the lower press table 240 is operated by two press pistons 245. The locking device for the closed form is supported in the example shown by the lower form half. The locking elements are mounted on the shorter sides of the form and consist of two pairs of tension rods 227 and 228 which are mounted on eccentric shafts 231. The eccentric shafts 231 are mounted rotatably in support brackets 232, shown more specifically in FIGURE 10, which are cast to the lower half 202 of the form. The tension rods 227 and 228 are U-shaped as shown in FIGURE 13 and pivotable so that its upper web part 227a can be swung over the bracket arm 235 of the upper form half 201. The effective position of the tension rods 227 is illustrated in FIGURE 9 on the left side of the drawing while the right side shows the unlocked position of the tension rods in which the upper form half 201 may be lifted from the upper press table 222.

The eccentric members 230 of the eccentric shaft 231 between the legs of the tension rods 227 in FIGURE 13 may receive clamping levers 233 which carry pressing rollers 234 at their outer ends. The clamping levers 233 are keyed to eccentric members 230 by several wedges 46 as may be seen in FIGURES 13 and 14. The eccentric portions 230 of the eccentric shafts 231 are placed relative to the clamping levers 233 in such a way that the eccentric members 230 are located at the setting of the clamping levers in the locked position (left half of FIGURE 9 and FIGURE 14) in the lower dead center point so that the tension rods 227 and 228 are pulled downwardly, while in the position of the clamping levers for the released position (right half of FIGURE 9) the tension rods are lifted up and are freely pivoted away from the bracket arms 235. The clamping levers are also inclined downwardly in the locked condition in such a way that the pressure rollers 234 extend over the lower support surface of the lower form half and may be used at the same time as rollers for moving the locked forms from and into the press. This is a considerable advantage in mounting the tension rods 227 and 228 as well as the clamping levers 233 and the lower form half 202.

In order to open the forms which have been moved into the press and locked, the transmission in the lever arm of the clamping levers 233 as well as of the eccentric portions 230 of the eccentric shaft 231 is employed in the same manner as in closing the forms. The clamping levers 233 may be pivoted downwardly by the press force, in the example shown by actuating the lower press piston 245, when the pressure rollers 234 are backed up from above. While during the closing of a form the pressure rollers 234 bear against the stationary plates 247 and 248 which extend laterally of the lower press table 240, during opening of the form hook-shaped abutments 249 and 250 are pivoted upwardly through slots 247a and 248a of the lateral plates from a rest position in the floor and are located above the pressure rollers 234. The pivoting drive for the abutment hooks 249 and 250 consists of rotary hydraulic piston drives 251 and 252 whose reciprocating racks are connected to pins 253 and 254 on the pivot shafts 255 and 256 of the abutment hooks. With reference to different lengths of the forms it is preferable to make the abutment hooks 249 and 250 adjustable relative to each other. For this purpose their bearing supports and the rotary piston drives 251 and 252 are in slide guides 257 and 258.

In FIGURES 11 and 12 a mechanical quick tension device is illustrated which engages the sides of the upper form half 201 which does not carry the locking elements, in the example of FIGURE 9 the long sides of the form. Outside of the largest existing form width opposite vertical shafts 265 are mounted in the upper press table 222, these shafts carrying a pivot latch 266 at their lower end. At the upper end the shafts 265 have a collar 265a for transmitting tension forces to the press table 222 and to gear 267 whose teeth are coupled with the gear rod 268 of a hydraulic slide piston rotary drive 269. Through this drive the pivot latch 266 may be rotated so that its taper 266a may be pivoted under the ledge 201c of the upper form half 201 in order to secure this form half, which is basically held in place by the magnetic tension plate 241. The pivot latches 266 have a projecting shape and are thus able to reach under the ledges 201c even in the case of smaller forms. The mechanical quick tensioning device need therefore be only strong enough to support the weight of the upper form half 201 when the magnetic adhesion force of the tension plate 241 is lost due to a decrease or complete disconnection of the current. The hydraulic slide piston rotary drives 269 arranged at both sides of the form on the press table 222 are appropriately connected in parallel with an actuating valve.

As may be seen from FIGURE 14 the bracket arms 235 at the upper form half 201 have at their upper surface as well as at their lower surface facing the form half 202 curved pressure plates 235a and 235b. At the upper, convexly curved pressure plates 235a the web portions 227a of the U-shaped tension rods 227 and 228 engage when the form is to be locked. The lower concavely curved pressure plates 235b serve as abutment surfaces for the connecting webs 227b which extend between the legs of the tension rods 227 and 228 (see FIGURE 13). These web portions are to be arranged at such a distance from the web portions 227a in respect of the height of the bracket arms 235 that the tension rods may pivot freely over the bracket arms 235 when the upper form half has been set down on the lower form half up to a relatively small remaining closing distance, and the press still operates under the relatively low prepressure. The distance between the surfaces of the web portions 227a and 227b which engage the pressure plates 235a and 235b is so selected that upon reverse rotation of the clamping levers 233 and eccentric shafts 231, i.e. upon locking the form, the web portions 227b will soon make contact with the lower pressure plates 235b so that the tension rods 227 and 228 transmit a spreading force acting between the form halves. Due to this spreading force the form halves are spread apart until the upper form half 201 is separated and may be lifted by the upper press table 222 in order to remove the finished pressed body.

FIGURE 14 shows further a device where on one portion of the pivot movements of the clamping levers 233 or on one portion of the eccentric stroke the tension rods 227 and 228 are brought automatically into the vertical operating position, and after the separation of the form halves are brought back again into the released position shown in dash and dot lines, in which the upper form half 201 may be lifted off. The arrangement consists in that the clamping levers 233 and the tension rods 227 and 228 are pivotable in the range of their bearing hubs, through a curvilinear slot 260 in one part and by a drive pin 261 extending into this slot from the other part, by a relatively limited movement. In the example of FIGURE 14 the slots 260 are located in the bearing hubs of the clamping levers 233 and the drive pins 261 in the bearing hubs of the tension rods 227. The slots 260 and the drive pins 261 are arranged relative to each other in such a way that upon rotating the clamping levers 233 back from the locking position shown in FIGURE 14 through the pivot arc indicated by 45°, the slots 260 move without effect over the stationary drive pins 261 until they abut at the end of their slots and deflect the tension rods by the further pivot movement of the clamping levers over the pivot arc of 24° from their working position. The entire pivot range of the clamping levers 233 is thus divided into a wider range in which the clamping levers 233 are movable relative to the tension rods 227 and 228 in order that the eccentric member 230 of the eccentric shaft 231 cause the locking or opening of the form, and into a smaller range of 24° for pivotally moving the tension rods.

In order that the tension rods illustrated in the dash-and-dot line position are taken along during the upward pivoting of the clamping levers 233 in the 24° range so as to come into the working position, resilient means which narrow down the slots are provided in the area of the slot ends 260a, in the example shown leaf spring 262, which open the way to the drive pins 261 only after the tension rods 227 and 228 have reached the working position and cannot be pivoted further.

The operation of the locking device illustrated in FIGURE 14 during opening of the forms is as follows: The locked form is moved over rollers 234 into the press whereby the support plates 247 and 248 engage the magnetic tension plates 242 of the lower press table 240 placed on the same level, as much as possible without a gap therebetween (FIGURE 10). Thereafter the abutment hooks 249 and 250 are pivoted upwardly into the abutment position shown in FIGURE 9. When the lower press table 240 is moved up the pressing rollers 234 are held down by the abutment hooks 249 and 250 so that the clamping levers 233 and the eccentric shaft 231 are rotated in the opening direction. The pressing rollers 234 roll inwardly over the support plates 247 and 248. Within the pivot range of 45° the tension rods 227 and 228 are guided upwardly by the eccentric portion 230 of eccentric shaft 231 so that they are at first without tension. In order to separate the form halves 201 and 202, a spreading force must be applied between them, which is also produced by the eccentric effect from the moment at which the connecting webs 227b bear against the concavely curved pressure plates 235b of the bracket arms 235. The eccentric portions 230 are rotated from their lower dead center point position which they assume during the locked condition by a portion of the pivot range of 45° and produce upon the engagement of the web portions 227b and bracket arms 235 the spreading force for opening the form. To the end of the pivot range the inner adhesion resistance of the form is overcome, whereby the upper press table 222 which has descended in the meantime maintains the upper form half 201 in an elevated state. In the meantime the slot end 260a of the curvilinear slots 260 has moved to the drive pins 261 and takes them along during the further pivoting of the clamping levers 233 in the 24° range, so that the tension rods 227 and 228 reach the pivot position indicated in dash-and-dot lines. Thereafter the press table 222 is moved upwardly with the upper form half 201 so that the molded part may be removed. The form halves remain centered relative to each other since the quick tension means for locating the form halves at the press tables are activated while the form is still closed.

In the last phase of the 24° pivot range where the eccentric portions need not produce much power the pressing rollers 234 may be guided inwardly further by the forward inclined front surfaces 249a and 250a of the abutment hooks 249 and 250 (FIGURE 9). The abutment hooks are pivoted back below the level of the support plates 247 and 248, as shown in FIGURE 10, after the forms have been opened.

After the form has been emptied, cleaned and refilled, whereby the lower press table 240 and thus the lower form half 202 is placed at the most favorable work level the upper press table 222 is lowered with a rapid motion. When a predetermined pre-pressure has been reached, which may be determined from the pressure of the fluid medium in the lower press cylinders, the latter are set to a constant pre-pressure so that the lower press table 240 moves downwardly with the not yet fully closed form under the higher pressure of the upper press table 222. When the pressure rollers 234 bear on the support plates 247 and 248 the clamping levers 233 start their 24° pivot range whereby the tension rods 227 and 228 are first pivoted into the work position as the springs 262 are so strong that they prevent the penetration of drive pin 261, and therefore carry along the tension rods against the momentum of their dead weight. When the tension rods are in the work position and cannot be pivoted further, the drive pins 261 push through the springs 262 and the 45° stroke of the clamping levers 233 for moving down the tension rods 227 and 228 begins, the latter transferring their pulling force through their web portions 227a to the bracket arms 235. As described above the press force is transmitted during the locking process over the locking device into the form to produce the maximum press force whereby the transmission force residing in the eccentric portions 230 and in the clamping levers 233 provides that for producing a final pressure of 1000 tons only a force of 200 tons is required at the clamping levers. The advantage of transmitting by the locking arrangement of the invention a multiple of the pressing force to the form presents an improvement over prior art arrangements independently of the concept of using more than one form in the molding process. In this case the form halves are securely fixed to the press tables in a conventional manner.

What is claimed is:

1. In a molding apparatus of the type which includes a press and a molding form having an upper half and a lower half for producing molded parts of plastic material, especially hardenable synthetic materials, in a hot pressing process in which the molding form is maintained under pressure after closing during a baking or hardening period, the improvement which comprises, a plurality of eccentric shafts rotatably mounted on one of said molding form halves, at least one tension rod pivotally mounted on each of said eccentric shafts, a plurality of locking members on the other molding form half engageable by said tension rods, means for pivoting said tension rods into a locking position with said locking members and means for rotating said eccentric shafts in one direction to exert a pulling force on said locking member with said tension rods and lock said molding form halves together.

2. A molding apparatus in accordance with claim 1 wherein said means for rotating said eccentric shafts include said means for pivoting said tension rods.

3. A molding apparatus in accordance with claim 1 including means for rotating said eccentric shafts in the opposite direction to exert a pushing force on said locking members with said tension rods to separate said molding form halves.

4. Molding apparatus in accordance with claim 1 including a movable support for receiving said molding form halves with said tension rods and said eccentric shafts and wherein said rotating means for said eccentric shafts include auxiliary drive means for exerting said pulling force through said tension rods independently of the force of the said press.

5. Molding apparatus in accordance with claim 1 wherein said press includes a movable press table and wherein said means for rotating said eccentric shafts include clamping levers driven by said movable press table and an elastic medium between said movable press table and the associated molding form half for predetermining the extent of the pivotal movement of said clamping levers when the molding form halves are in a substantially closed position.

6. Molding apparatus in accordance with claim 5 wherein the elastic medium is a hydraulic fluid and including a pressure relief valve through which said hydraulic fluid is permitted to escape when the pressing force required by the press is exceeded.

7. Molding apparatus in accordance with claim 1 wherein said locking members include a plurality of bracket arms on said other molding form half and wherein said tension rods are substantially U-shaped in configuration, said tension rods having a first web portion adapted for engagement with one surface of said bracket arms in one rotary position of said eccentric shafts for locking said form halves together, a second web portion on each of said tension rods adapted for engagement with another surface of said bracket arms in another rotary position of said eccentric shafts whereby a pushing force is transmitted by said tension rods to said bracket arms for separating said form halves.

8. Molding apparatus in accordance with claim 7 including fixed abutments associated with said press and wherein said press includes an upper and lower movable press table and wherein said means for rotating said eccentric shafts include at least one clamping lever on each of said eccentric shafts, said clamping levers being actuated by said fixed abutments during the simultaneous downward movement of said upper and lower press tables to rotate said eccentric shafts in said one direction and lock said molding form halves together.

9. Molding apparatus in accordance with claim 8 including retractable abutments associated with said fixed abutments, said retractable abutments being arranged to actuate said clamping levers during the movement of said upper and lower press tables in the opposite direction to rotate said eccentric shafts in the opposite direction and release said locked molding form halves.

10. Molding apparatus in accordance with claim 9 including a curvilinear slot in each of said clamping levers, a pin on each of said tension rods projecting into said curvilinear slot on an associated clamping lever to permit limited relative pivotal movement between said tension rods and clamping levers, said pin being arranged to engage one end of said slot when said molding form halves are in the locked position, said pin being arranged to engage the other end of said slot when said molding halves are in the unlocked position, resilient slot narrowing means in said slot other end for releasably retaining said pin to permit common movement of said clamping lever and tension rod for pivoting said tension rods into locking position with said bracket arms.

References Cited by the Examiner

UNITED STATES PATENTS

| | | | |
|---|---|---|---|
| 1,027,695 | 5/1912 | Covert | 22—109 X |
| 3,195,186 | 7/1965 | Gauban et al. | 18—43 |

FOREIGN PATENTS

| | | |
|---|---|---|
| 385,252 | 1923 | Germany. |
| 1,071,901 | 1959 | Germany. |

J. SPENCER OVERHOLSER, *Primary Examiner.*

E. MAR, *Assistant Examiner.*